UNITED STATES PATENT OFFICE.

JOSEPH POLIAKOFF, OF MOSCOW, RUSSIA.

COMPOSITION OF MATTER.

SPECIFICATION forming part of Letters Patent No. 714,235, dated November 25, 1902.

Application filed March 4, 1902. Serial No. 96,700. (No specimens.)

*To all whom it may concern:*

Be it known that I, JOSEPH POLIAKOFF, a subject of the Czar of Russia, and a resident of Moscow, Russia, have invented a new and Improved Composition of Matter, of which the following is a full, clear, and exact description.

This invention relates to an improvement in a composition of matter designed particularly for use in the construction of molded articles—such as ornaments, vases, medallions, and the like; and the object is to provide a composition that is practically unbreakable and waterproof.

In the formation of the composition I employ the following ingredients, measured by weight: one hundred (100) parts of glue, which is reduced to liquid state by heating in a suitable quantity of water, and to the liquid glue is added a body material, such as plaster or clay, mixed in water. There may be from one hundred (100) to two hundred (200) parts of this body material, depending upon the article to be formed—that is, the thinner the article to be produced a less proportion of body material is to be used. The material thus mixed is kept over a regulated flame and allowed to boil under agitation by stirring, and from twenty (20) to thirty (30) parts of glycerin are added, which renders the composition practically unbreakable. To give a delicacy or softness of appearance, about twenty (20) to thirty (30) parts of wax are added. Finally and just before the composition is to be used in a mold from two (2) to five (5) parts of chrome-alum are added, which not only causes a rapid drying, but renders the composition waterproof. A larger proportion of this chrome-alum may be used to raise the melting-point of the composition or to make its melting impossible.

Having thus described my invention, I claim as new and desire to secure by Letters Patent—

1. The process of forming a composition of matter, consisting in reducing glue to liquid form under heat, adding a body material, adding glycerin while the material is boiling, then adding wax, and finally adding chrome-alum.

2. The process of forming a composition of matter, consisting in reducing glue to liquid form under heat, adding plaster mixed with water, and bringing the material to boiling-point, then adding glycerin and wax, and finally adding chrome-alum.

3. A composition of matter, consisting of glue, plaster or clay, glycerin, wax and chrome-alum.

In testimony whereof I have signed my name to this specification in the presence of two subscribing witnesses.

JOSEPH POLIAKOFF.

Witnesses:
JNO. M. RITTER,
C. R. FERGUSON.